April 13, 1943.  R. P. BREESE  2,316,396
BRAKE
Filed Feb. 16, 1940  3 Sheets-Sheet 1

INVENTOR.
ROBERT P. BREESE
BY Jerome R. Cox,
ATTORNEY.

April 13, 1943. R. P. BREESE 2,316,396
BRAKE
Filed Feb. 16, 1940 3 Sheets-Sheet 2
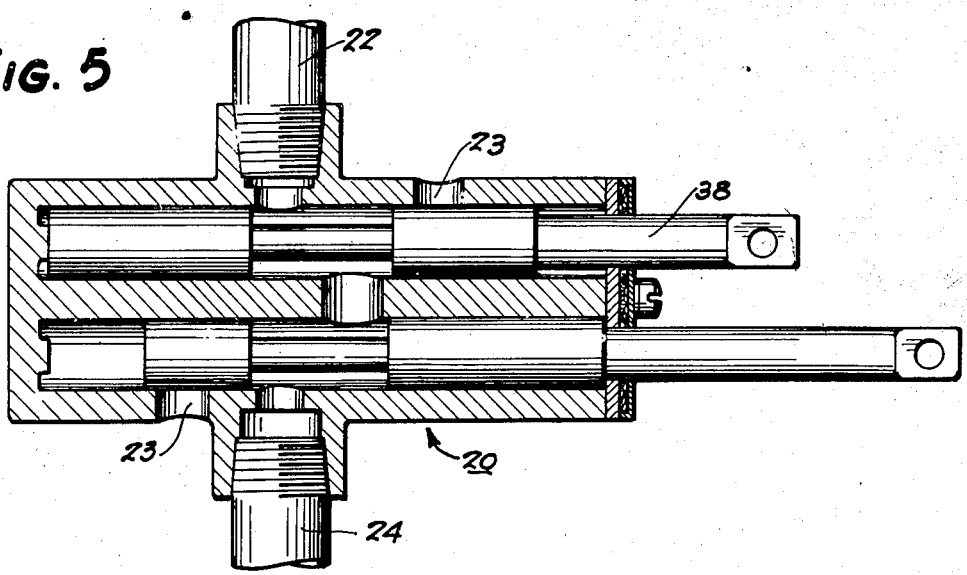
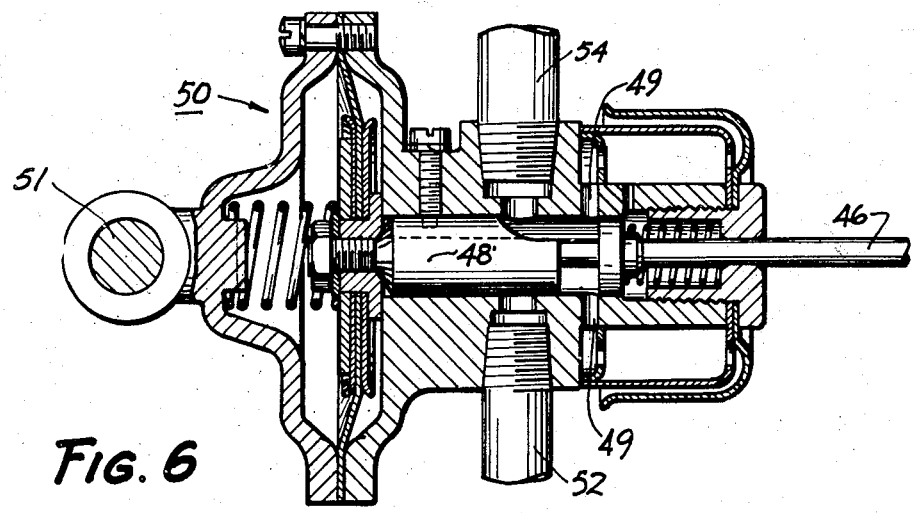
INVENTOR.
ROBERT P. BREESE
BY Jerome R. Cox
ATTORNEY.

April 13, 1943.  R. P. BREESE  2,316,396
BRAKE
Filed Feb. 16, 1940  3 Sheets—Sheet 3

INVENTOR.
ROBERT P. BREESE
BY M. W. McConkey
ATTORNEY.

Patented Apr. 13, 1943

2,316,396

UNITED STATES PATENT OFFICE 2,316,396

BRAKE

Robert P. Breese, New York, N. Y., assignor to Bendix Aviation Corporation, South Bend, Ind., a corporation of Delaware Application February 16, 1940, Serial No. 319,350

5 Claims. (Cl. 192—13)

This application is a continuation in part of my application Serial No. 59,663 now forfeited. The invention of this application relates to control systems for automotive vehicles and is especially directed to means for controlling and operating the brakes and clutch of such a vehicle.

One of the objects of this invention is the provision of means for operating such brakes and clutch conveniently and easily.

One of the features of the invention is the specific arrangement and positioning of clutch and brake operating pedals for maximum efficiency.

Further objects and features of the invention will be apparent from a reading of the subjoined specification and claims and from a consideration of the accompanying drawings, in which:

Figure 1:
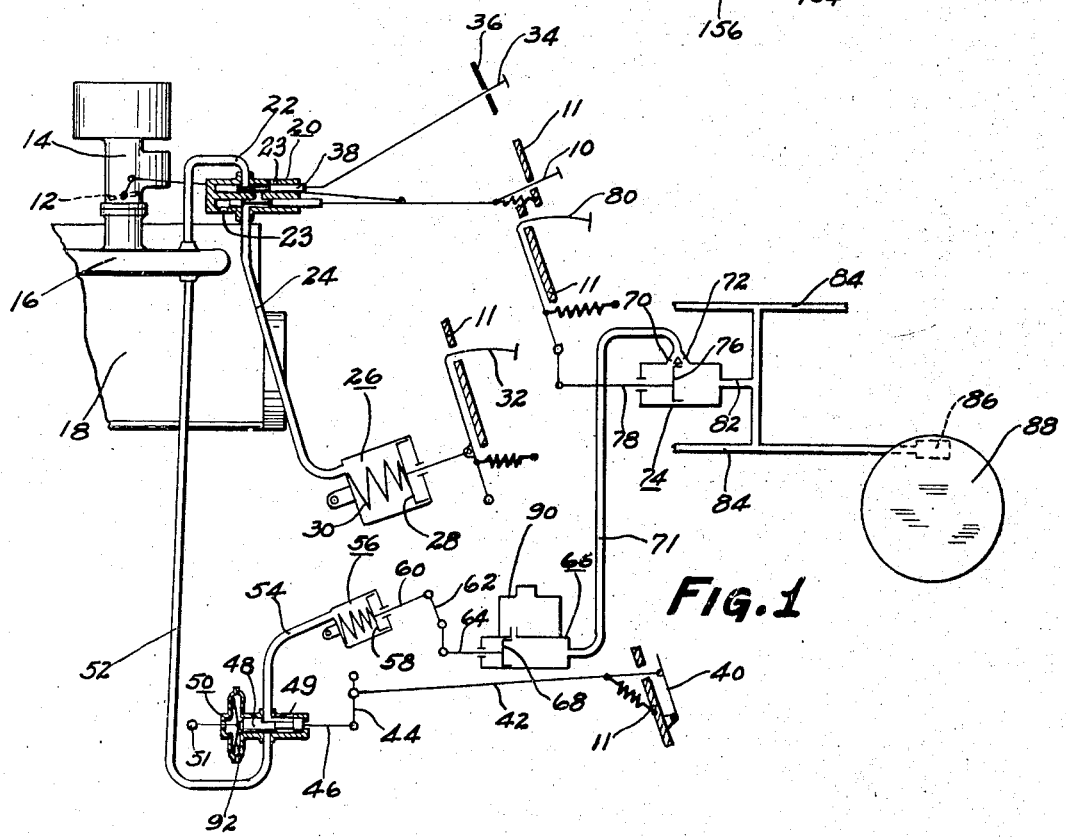
Figure 1 is a diagrammatic view indicating controls for the carburetor, for the brakes, and for the clutch of an automobile.
Figure 7:
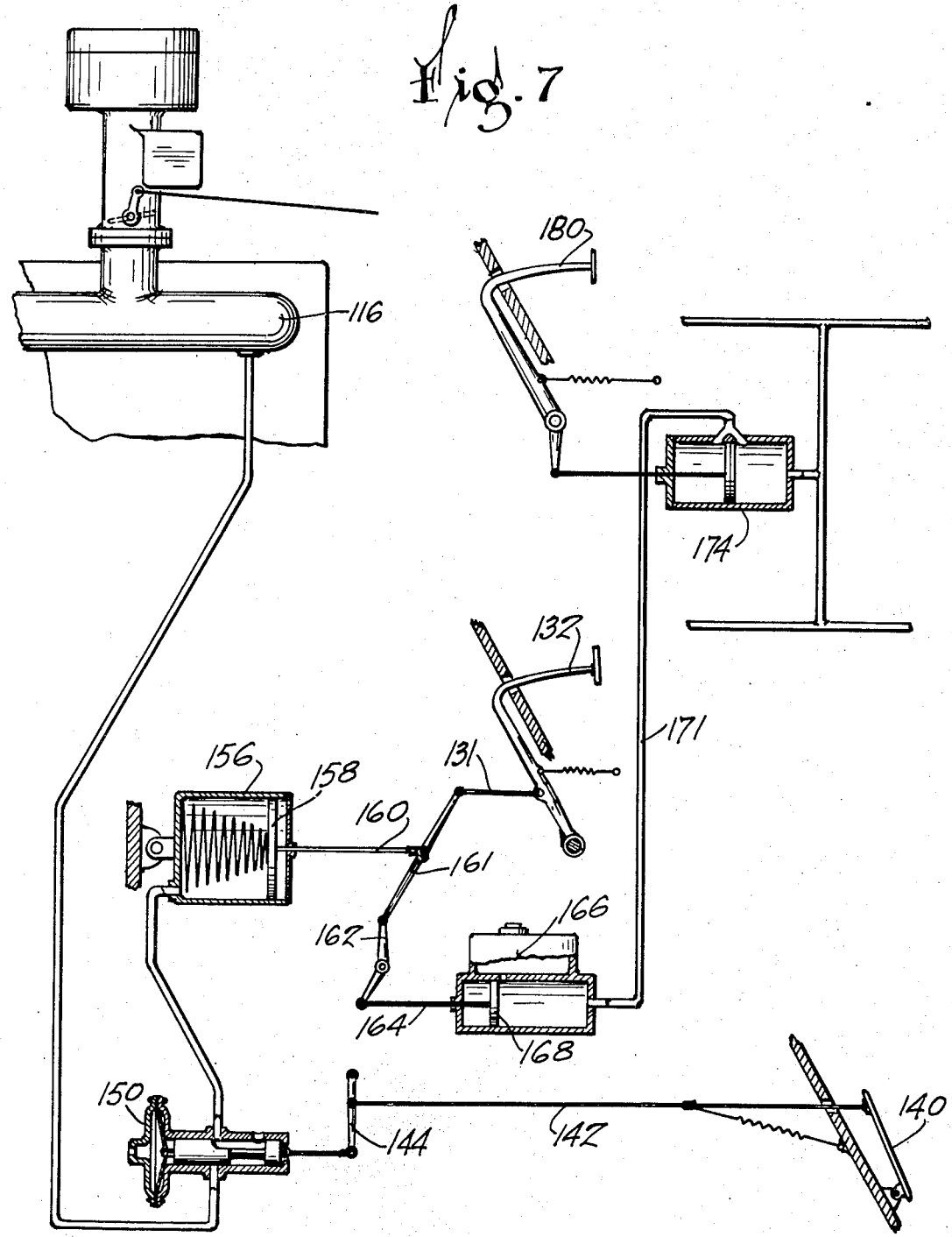

Figures 5 and 6 are views on an enlarged scale of valves 20 and 50, respectively; and Figure 7 is a diagrammatic view showing a modification of the system of Figure 1.

Figure 2:
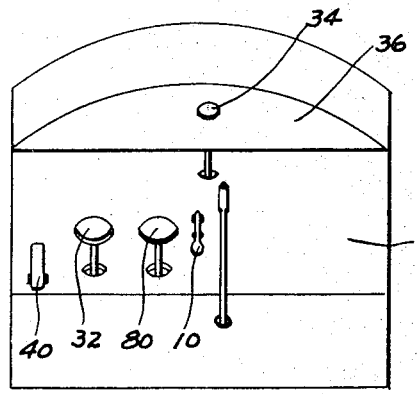
Figure 2 is a plan view of a fragment of the automobile showing especially the arrangement of the pedals.

Referring in detail to the drawings, there is shown in Figures 1 and 2 an accelerator pedal 10 which extends through the floor-board 11 and which by means of a throttle valve 12 controls the amount of fuel supplied from the carburetor 14 to the intake manifold 16 and thus controls the speed of the engine 18. The pedal 10 is also connected to a valve 20 interposed between a conduit 22 connected to the intake manifold 16 and a conduit 24 connected to a clutch control cylinder 26. The valve 20 has an atmospheric port 23 and the connection between it and the accelerator pedal 10 is so arranged that when the pedal 10 is depressed the cylinder 26 is connected with the atmosphere and a piston 28 in the cylinder 26 is allowed to return to the right under the influence of a spring 30, thus allowing the clutch pedal 32 to be released and the clutch engaged. However, when the accelerator pedal 10 is released the valve 20 connects the conduit 22 with the conduit 24 and the suction in the manifold 16 draws air from the cylinder 26 thus moving the piston 30 to the left, operating the clutch pedal 32 and disengaging the clutch.

However, if desired the automatic operation of the clutch may be eliminated by operation of the control 34 on the dash 36, thus moving the plunger 38 in the valve 20 from the position shown to a position to block the connection to the conduit 22 and to open the conduit 24 continuously to the atmosphere.

Usually the brakes are operated by means of the treadle 40 which is connected through a link 42 with a lever 44 in turn connected through a link 46 with the plunger 48 of a valve 50. The valve 50 is interposed between a conduit 52 connected to the intake manifold 16 and a conduit 54 connected to a small power cylinder 56. A valve 50 is formed with an atmospheric port 49. The power cylinder 56 is provided with a piston 58 connected by a link 60 and a lever 62 with a piston rod 64 of an auxiliary master cylinder 66 and when energized operates the piston 68 thereof to force liquid through a conduit 71 to the supply port 70 and the compensating port 72 of the main master cylinder 74. The main master cylinder 74 is provided with a piston 76 connected by a piston rod 78 to be operated when desired by the main brake pedal 80. Liquid acted on by either the piston 68 or the piston 76 may be forced through conduits 82 and 84 to fluid motors such as 86 for wheel brakes 88.

A supply tank 90 associated with auxiliary master cylinder 66 supplies liquid for both master cylinders to compensate for changes in volume due to changes in temperature or for losses of liquid from any cause. Associated with the valve 50 is a diaphragm 92 connected to the automobile at 51 which provides a reaction or "feel" for the brake pedal 40. The left side of the diaphragm 92 is at all times subject to atmospheric pressure, while the right side of the diaphragm is connected as shown in Figure 6 to the pressure prevailing in conduit 54, the control conduit. As long as atmospheric pressure exists in conduit 54 the pressures on the diaphragm are balanced, but the admission of vacuum to conduit 54 to actuate power cylinder 56 causes an unbalance over the diaphragm tending to force the diaphragm and the plunger 48 to the right against the pressure exerted by the operator's foot and tending at the same time to close the valve 50 and prevent further actuation of power cylinder 56.

Figure 3:
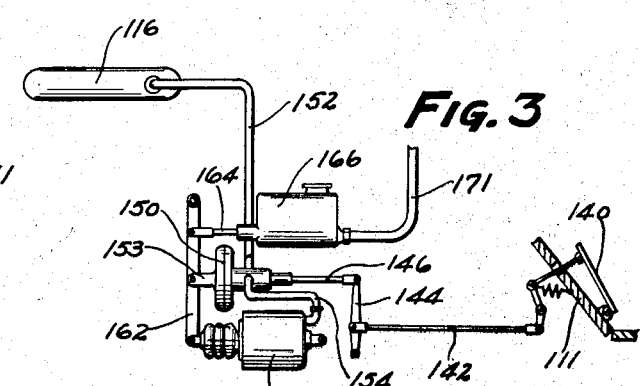
Figures 3 and 4 are diagrammatic views showing alternative arrangements of the connections between the brake pedal and the auxiliary master cylinders for the brakes illustrating alternative operation of the master cylinders.

In the arrangement shown in Figure 3, the pedal 140 is pivoted on the floor board 111 and is connected by a link 142 to a lever 144 in turn connected to a control rod 146 for the valve 150. The valve 150 has an extension 153 which is connected to a lever 162, the lever being connected to the piston of the power cylinder 156 and to a piston rod 164 of a master cylinder 166. The master cylinder 166 is connected by a conduit 171 with the wheel cylinders for the brakes (not shown). The valve 150 is connected by a conduit 152 with the intake manifold 116 and by a conduit 154 with the power cylinder 156. In this arrangement there is provided a followup of a pedal 140 as the brake is applied as well as "feel."

Figure 4:
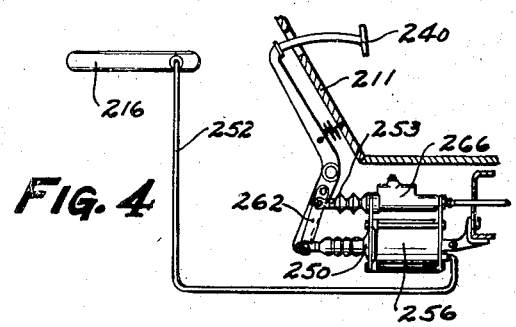

In Figure 4 a similar unit is shown, but this is made more compact in that the valve 205 is positioned within the power cylinder 256 and the auxiliary master cylinder 266 is located on the power cylinder 256. The pedal 240 extends through the floor board 211 and has pivoted thereon a lever 262 connected at its lower end to the piston rod of the power cylinder 256. The piston rod of the power cylinder 256 carries one part of the valve 250 and the lower end of the pedal lever 240 is connected to a relatively movable part of said valve 250. An intermediate point on the lever 262 is connected to the piston rod 253 of the hydraulic cylinder 266. A conduit 252 connects the intake manifold 216 to the power cylinder 256.

In Figure 4 the unit is made more compact in that the valve 250 is positioned within the power cylinder 256 and the auxiliarly master cylinder 266 is located on the power cylinder 256. In this arrangement feel is obtained by reaction of the lever 262 eliminating the need of a diaphragm.

In the operation of the device disclosed in Figures 1 and 2, with the engine running and the plunger 36 in the normal position as shown, and the accelerator pedal released, suction from the intake manifold operates the piston 30 of the cylinder 26 to disengage the clutch. The operator uses his right foot to depress the accelerator pedal and thus increases the speed of the engine and destroying the connection between the manifold 16 and the cylinder 26, thus causes the clutch to engage. If he desires then to slow down, he places his left foot on the treadle 40 and thus applies his brakes lightly. If he desires further braking he removes his right foot from the accelerator pedal 10 and exerts force on the brake pedal 80. It is to be noted that due to the fact that his left foot is idle and may be near the relatively low treadle 40, the time required to initiate the braking is greatly diminished. In an emergency requiring quick braking, by the time he has moved his right foot from the accelerator pedal 10 and put it on the brake pedal 80 (as required in ordinary systems before he starts to apply the brakes) the brakes have been applied and only a slight additional movement is necessary to accomplish maximum braking. Should the vacuum fail for any reason he can operate his brake and clutch in the usual way, inasmuch as the first movement of the piston 76 cuts off the compensating port 72 and its connection with the auxiliary cylinder 66. The devices of Figures 3 and 4 are similarly operated.

The control system of Figure 7 is similar in many respects to that shown in Figure 1. The elements in Figure 7 will therefore be given the numbers of corresponding elements in Figure 1 plus 100.

The control valve 20 and the power cylinder 26 are eliminated from the system of Figure 1. A power cylinder 156 is provided to actuate both a clutch pedal 132 and a brake applying lever 162. Operation of the device is believed to be evident from comparison with the device of Figure 1. When the treadle 140 is moved by the left foot of the operator, the rod 142 swings the lever 144 about its fulcrum to crack the valve 150. Cracking the valve opens the left end of the power cylinder 156 to vacuum from the manifold 116. Vacuum in the power cylinder draws the piston 158 to the left, pulling the link 160. The link 160 is attached to a crossbar 161. Movement of the crossbar 161 pulls the rod 131 to depress the clutch pedal 132 and also moves the lever 162 about its axis, forcing the rod 164 and the piston 168 into the auxiliary master cylinder 166 to displace liquid therefrom through conduit 171 and main master cylinder 174 to take up the slack and/or partially apply the vehicle brakes. The main master cylinder 174 may at any time be actuated by the pedal 180 and linkage connected therewith to apply the brakes in the customary manner.

It is to be understood that the above described embodiments of my invention are for the purpose of illustration only and various changes may be made therein without departing from the spirit and scope of my invention.

I claim:

1. In a system for the control of automobiles, a clutch, hydraulically operated brakes, a manual control for the brakes, a separate power control for the brakes, said power control also actuating the clutch, a main master cylinder connected with said manual brake control, and means comprising an auxiliary master cylinder connected with said power brake control for forcing liquid from said auxiliary master cylinder through the main master cylinder to the brakes, whereby after the power application of the brakes the liquid so forced by the auxiliary master cylinder may be trapped upon operation of the main master cylinder and whereby the pedal stroke of the main master cylinder is minimized.

2. In a system for the control of automobiles, hydraulically operated brakes, a manual control for the brakes, a separate differential air pressure power control for the brakes, a main master cylinder connected with said manual brake control, and means comprising an auxiliary master cylinder connected with said power brake control for forcing liquid from said auxiliary master cylinder through the main master cylinder to the brakes, whereby after the power application of the brakes the liquid so forced by the auxiliary master cylinder may be trapped upon operation of the main master cylinder and whereby the pedal stroke of the main master cylinder is minimized.

3. A brake control system comprising a master cylinder having a piston, a manual brake control connected to said piston, a second master cylinder connected to the first master cylinder and having a piston therein, a reservoir associated with the second master cylinder, a power cylinder connected to the piston in the second master cylinder, a control valve for actuating the power cylinder, and a manual control independent of the aforesaid manual control for operating the control valve.

4. In a control system for a vehicle having brakes and a clutch, in combination, a first master cylinder having a piston, a manual brake control connected to said piston, a second master cylinder connected to the first master cylinder and having a piston therein, a manual control for the clutch, and a power cylinder operatively connected to the clutch manual control and to the piston in the second master cylinder.

5. In a vehicle having driving means and braking means, a clutch associated with the driving means, a manual control for the clutch, a manual control for the braking means, a main master cylinder connected with said manual brake control, an auxiliary master cylinder, a power cylinder for simultaneously controlling the clutch and the auxiliary master cylinder, and manually operable means for controlling the operation of said power cylinder.

ROBERT P. BREESE.